United States Patent Office 3,652,533
Patented Mar. 28, 1972

3,652,533
PHENYL-AZO-HYDROXYNAPHTHOLIC ACID AMIDE PIGMENTS
Armand Roueche, Neu-Allschwil, Switzerland, assignor to Ciba Limited, Basel, Switzerland
No Drawing. Filed Nov. 19, 1968, Ser. No. 777,164
Claims priority, application Switzerland, Dec. 6, 1967, 17,111/67
Int. Cl. C07c 107/08; C09b 29/28
U.S. Cl. 260—203               7 Claims

ABSTRACT OF THE DISCLOSURE

Monoazo pigment of the formulae

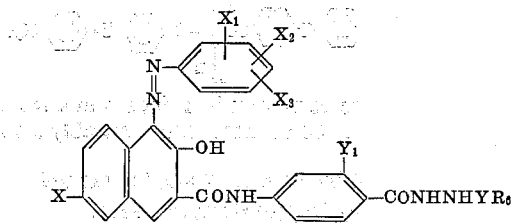

and

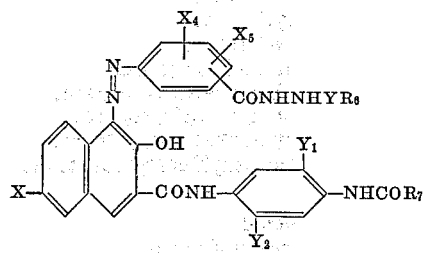

in which X is hydrogen, bromine, nitro or lower alkoxy, Y is —CO— or —SO$_2$—, X$_1$ and X$_2$ each is hydrogen, chlorine, lower alkyl, lower alkoxy, phenoxy, chlorophenoxy, lower alkylphenoxy, nitro, lower carbalkoxy, carbophenoxy, lower alkanoylamino or trifluoromethyl, X$_3$ is hydrogen, chlorine or —CONHR$_5$ in which R$_5$ is hydrogen, lower alkyl, phenyl or substituted phenyl, Y$_1$ and Y$_2$ each is hydrogen, chlorine or lower alkyl and R$_6$ is hydrogen, lower alkyl, phenyl or substituted phenyl, X$_4$ is chlorine, lower alkyl, lower alkoxy, lower carbophenoxy, phenoxy, chlorophenoxy or lower alkyl phenoxy, X$_5$ is hydrogen or chlorine, and R$_7$ is hydrogen, lower alkyl, amino, lower alkylamino, unsubstituted phenyl or phenylamino, substituted phenyl or substituted phenylamino; suitable for the spin-coloration of filament and staple-fibre viscose, cellulose ethers, cellulose esters, polyamides, polyurethanes and polyesters.

---

The present invention is based on the observation that valuable new monoazo pigments of the formula (1)   R$_1$—N=N—R$_2$—CONHR$_3$ in which R$_1$ and R$_3$ each represents an aromatic residue and R$_2$ represents a hydroxynaphthalene residue in which the azo, hydroxy and carboxylic acid amide groups are in 1,2,3-position or the residue of an enolizable or enolized ketomethylene compound, and in which one of the residues R$_1$ and R$_3$ contains a group of the formula

—CONHNHYR$_4$ in which Y represents an —SO$_2$ group or preferably a —CO— group and in which R$_4$ represents a hydrogen atom, an alkyl, aryl or heterocyclic residue when Y represents a —CO— group and R$_4$ represents an alkyl, aryl or heterocyclic residue when Y represents an —SO$_2$— group, may be obtained by (a) condensing a carboxylic acid halide of the formula R$_1$N=N—R$_2$—COhal with an amine of the formula R$_3$NH$_2$, or (b) coupling a diazo compound or diazoamino compound of an amine of the formula R$_1$NH$_2$ with a coupling component of the formula R$_2$CONH—R$_3$, the components being selected such that one of the residues R$_1$ or R$_3$ contains a group of the formula —CONHNHYR$_4$.

Since the products of the invention are pigments, they must not contain groups imparting solubility in water, especially acidic groups imparting solubility in water, for example, sulphonic acid groups or carboxylic acid groups.

Pigments that are of special interest are those of the formula (2)

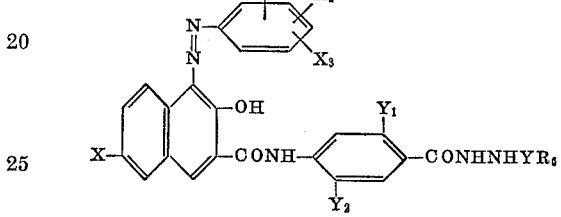

or (2a)

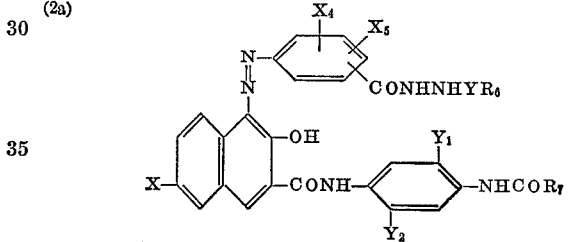

in which formulae X represents a hydrogen or a halogen atom or a nitro or alkoxy group, Y represents an —SO$_2$— group or preferably a —CO— group, X$_1$ and X$_2$ each represents a hydrogen or a halogen atom or an alkyl, alkoxy, phenoxy, nitro, cyano, carboxylic acid ester, aliphatic acylamino or trifluoromethyl group, X$_3$ represents a hydrogen or a halogen atom or a group of the formula —CONHR$_5$ in which R$_5$ represents a hydrogen atom, an alkyl group or a phenyl residue that may be substituted, for example, by halogen atoms or alkyl, trifluoromethyl, alkoxy, nitro, cyano, carbalkoxy or alkanoylamino groups, X$_4$ represents a hydrogen or a halogen atom or an alkyl, alkoxy, carboxylic acid ester or phenoxy group, X$_5$ represents a hydrogen or a halogen atom, Y$_1$ and Y$_2$ each represents a hydrogen or a halogen atom or an alkyl or nitro group, R$_6$ represents a hydrogen atom, an alkyl group or a phenyl residue that may be substituted, for example, by halogen atoms or alkyl, alkoxy, nitro, carbalkoxy or aliphatic acylamino groups, and R$_7$ represents a hydrogen atom, an alkyl, aryl, amino, alkylamino or arylamino group or a heterocyclic residue.

Pigments that are also of interest are those containing enolizable ketomethylene groups that are derived, for example, from an acetoacetarylide or a pyrazolone. The following are given as examples:

(3)

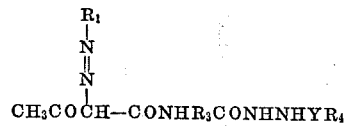

(4) 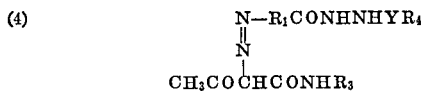

(5) 

in which $R_1$, $R_3$, $R_4$ and Y have the meanings given above, $R_8$ and $R_9$ each represents a benzene residue and Z represents a carboxylic acid amide group.

The pigments of Formula 2 may be obtained by condensing a carboxylic acid chloride of the formula (6) 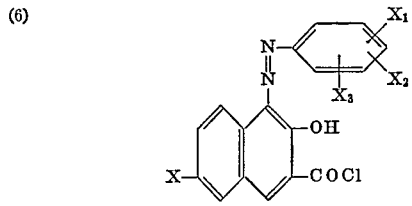

in which X, $X_1$, $X_2$ and $X_3$ have the meanings given above, with an amine of the formula (7) 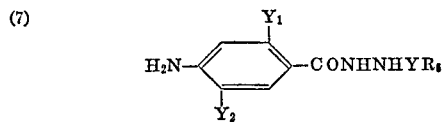

in which Y, $Y_1$, $Y_2$ and $R_6$ have the meanings given above.

The carboxylic acids from which the halides are derived may be obtained by coupling a diazo compound of an aminobenzene of the formula (8) 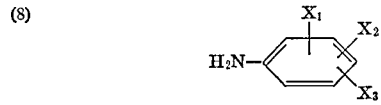

with a 2,3-hydroxynaphthoic acid of the formula

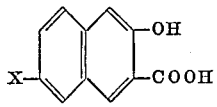

The following are given as examples of aminobenzenes of Formula 8:

2-, 3- or 4-chloroaniline,
3,4-dichloroaniline,
2,3-dichloroaniline,
2,4-dichloroaniline,
2,5-dichloroaniline,
2,6-dichloroaniline,
2,4,5-trichloroaniline,
2,4,6-trichloroaniline,
2-, 3- or 4-bromoaniline,
2,4-dibromoaniline,
2,5-dibromoaniline,
2-methyl-5-chloroaniline,
2-methyl-4-chloroaniline,
2-methyl-3-chloroaniline,
2-chloro-5-trifluoromethylaniline,
2-, 3- or 4-nitroaniline,
4-chloro-2-nitroaniline,
2-chloro-4-nitroaniline,
4-methyl-3-nitroaniline,
2,4-dimethyl-3-nitroaniline,
2-methyl-5-nitroaniline,
2-methyl-4-nitroaniline,
2- and 4-methoxyaniline,
3-chloro-4-methoxyaniline,
2-methoxy-5-nitroaniline,
2-methoxy-5-chloroaniline,
2-methoxy-5-trifluoromethylaniline,
2-amino-4-trifluoromethyl-4'-chlorodiphenylether,
2-nitro-4-ethoxyaniline,
2-amino-4-chlorodiphenylether,
2-amino-2',4-dichlorodiphenylether,
2-amino-4,4'-dichlorodiphenylether,
2-amino-5-nitrobenzoic acid methylester,
4-amino-3-nitrobenzotrifluoride,
2-amino-5-nitrobenzotrifluoride,
1-amino-2-methylbenzene-5-carboxylic acid methylester,
1-amino-2-chlorobenzene-5-carboxylic acid methylamide,
2-amino-4-trifluoromethyldiphenylether,
4-methyl-3-aminobenzoic acid amide,
4-chloro-3-aminobenzoic acid amide,
2,4-dichloro-5-aminobenzoic acid amide,
4-methoxy-3-aminobenzoic acid amide,
4-methyl-3-aminobenzoic acid-2'-chloro-5'-trifluoromethylanilide,
4-chloro-3-aminobenzoic acid-2',5'-dichloroanilide,
4-chloro-3-aminobenzoic acid-2'-chloro-5'-carbomethoxyanilide,
4-chloro-3-aminobenozic acid-3'-chloroanilide,
4-chloro-3-aminobenzoic acid-2'-chloro-5'-trifluoromethylanilide,
4-chloro-3-aminobenzoic acid-3'-trifluoromethylanilide,
4-chloro-3-aminobenzoic acid-3',5'-bis-trifluoromethylanilide,
4-chloro-3-aminobenzoic acid-2',4',5'-trichloroanilide,
2,4-dichloro-5-aminobenzoic acid-2',5'-dichloroanilide,
2,4-dichloro-5-aminobenzoic acid-2',4'-dichloroanilide,
2,4-dichloro-5-aminobenzoic acid-3'-trifluoromethylanilide,
2,4-dichloro-5-aminobenzoic acid-3'-chloroanilide,
5-amino-4-methoxy-2-chlorobenzoic acid-3'-trifluoromethylanilide,
4-methyl-3-aminobenzoic acid-2',5'-dichloroanilide,
4-methyl-3-aminobenzoic acid-3'-trifluoromethylanilide,
4-methoxy-3-aminobenzoic acid-3'-chloroanilide,
4-methoxy-3-aminobenzoic acid-2',5-dichloroanilide,
4-methoxy-3-aminobenzoic acid-2',4',5'-trichloroanilide,
4-carbomethoxy-3-aminobenzoic acid anilide,
4-methoxy-3-aminobenzoic acid-3'-trifluoromethylanilide,
4-carbethoxy-3-aminobenzoic acid-2',5'-dichloroanilide,
4-methoxy-3-aminobenzoic acid-3',5'-bis-trifluoromethylanilide,
4-methoxy-3-aminobenzoic acid-2'-chloro-5'-trifluoromethylanilide,
4-methoxy-3-aminobenzoic acid-2',5'-dimethoxy-4'-chloroanilide,
4-methoxy-3-aminobenzoic acid-2',5'-dimethyl-4'-chloroanilide,
4-aminobenzoic acid-2',4'-dichlorophenylamide,
4-aminobenzoic acid-2'-chloro-5'-trifluoromethylphenylamide,
4-amino-3-methylbenzoic acid-3'-trifluoromethylphenylamide,
4-amino-3-methylbenzoic acid-4'-chlorophenylamide and
4-amino-3-nitrobenzoic acid-2',5'-dichlorophenylamide.

The azo dyestuff carboxylic acids obtained are treated with substances which are capable of converting carboxylic acids into their acid halides, for example, their acid chlorides or bromides, such substances being, in particular, phosphorus halides, for example, phosphorus pentabromide, phosphorus pentachloride or phosphorus trichloride, phosphorus oxyhalides and preferably thionyl chloride.

The treatment with the said acid halogenating agents is advantageously carried out in an inert organic solvent, for example, dimethylformamide, a chlorobenzene, for example, monochlorobenzene or dichlorobenzene, toluene, xylene or nitrobenzene. If necessary, dimethylformamide may be used in conjunction with the last five solvents specified. When preparing the carboxylic acid halides, it is generally advantageous first to dry the azo compounds, which are prepared in an aqueous medium, or to free them from water by azeotropic distillation in an organic solvent. If desired, azeotropic drying may be carried out immediately prior to the treatment with the acid halogenating agents.

The azo dyestuff carboxylic acid chlorides so obtained may be condensed with monoamines of the formula $$H_2N-R_3CONHNYR_4$$

especially those of Formula 7. The following amines are given as examples:

4-amino-N,N'-dibenzoylhydrazine,
4-amino-4'-chloro-N,N'-dibenzoylhydrazine,
4-amino-2',4'-dichloro-N,N'-dibenzoylhydrazine,
4-amino-4'-methoxy-N,N'-dibenzoylhydrazine,
4-amino-3-methyl-N,N'-dibenzoylhydrazine,
4-amino-3-methyl-4'-chloro-N,N'-dibenzoylhydrazine,
4-amino-3-methyl-2',4'-dichloro-N,N'-dibenzoylhydrazine,
4-amino-3-methyl-4'-methyl-N,N'-dibenzoylhydrazine,
4-amino-3-methyl-4'-carbomethoxy-N,N'-dibenzoylhydrazine,
4-amino-3-methyl-4'-methoxy-N,N'-dibenzoylhydrazine,
4-amino-2',5'-dichloro-N,N'-dibenzoylhydrazine,
N-4-aminobenzoyl-N'-formylhydrazine,
N-4-aminobenzoyl-N'-acetylhydrazine,
N-4-amino-3-methylbenzoyl-N'-acetylhydrazine,
4-amino-2-chloro-2',4'-dichloro-N,N'-dibenzoylhydrazine,
4-amino-3-nitro-2'-chloro-N,N'-dibenzoylhydrazine,
3-amino-4,4'-dichloro-N,N'-dibenzoylhydrazine,
3-amino-4-methyl-N,N'-dibenzoylhydrazine,
3-amino-4-methoxy-2',5'-dichloro-N,N'-dibenzoylhydrazine,
N-(4-aminobenzoyl)-N'-nicotinylhydrazine,
N-(4-aminobenzoyl)-N'-furoylhydrazine,
N-(4-aminobenzoyl)-N'-thienoylhydrazine,
N-(4-aminobenzoyl)-N'-para-toluenesulphonylhydrazine and
N-(4-amino-3-methylbenzoyl)-N'-benzenesulphonylhydrazine.

These amines may be obtained by known methods, for example, by condensation of a nitrobenzoylhydrazine with an acid chloride and catalytic reduction of the nitro compound obtained.

Condensation between the carboxylic acid halides of the type defined above and the amines is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid halides obtained from the carboxylic acids. In some cases, however, isolation of the acid halides may be omitted without harm and condensation may be carried out immediately after preparation of the carboxylic acid halides.

In process (b) of the invention, the new pigments may be obtained by coupling a diazotised amine, especially a diazotized aminobenzene of the formula $H_2N-R_1$, with a coupling component of the formula $R_2CONHR_3$.

The following amines are given as examples:

3-amino-4-chloro-N,N'-dibenzoylhydrazine,
3-amino-4,4'-dichloro-N,N'-dibenzoylhydrazine,
3-amino-4-methyl-N,N'-dibenzoylhydrazine,
3-amino-4-methoxy-N,N'-dibenzoylhydrazine,
3-amino-4,6,4',2'-tetrachloro-N,N'-dibenzoylhydrazine,
3-amino-4-methyl-2',5'-dichloro-N,N'-dibenzoylhydrazine,
N-3-amino-4-chlorobenzoyl-N'-acetylhydrazine,
N-3-amino-4-methylbenzoyl-N'-acetylhydrazine and
N-3-amino-4-methoxybenzoyl-N'-acetylhydrazine.

Coupling is effected by gradual addition of the aqueous alkaline solution of the coupling component to the acidic solution of the diazonium salt. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkali solution of the coupling component advantageously contains a wetting agent, a dispersing agent or an emulsifying agent, for example, an aralkyl sulphonate, for example, dodecylbenzene sulphonate or the sodium salt of 1,1'-naphthylmethane sulphonic acid, polycondensation products of alkylene oxides, for example, the product obtained by reacting ethylene oxide with para-tertiary-octyl-phenol, and also the alkylesters of sulphoricinoleates, for example, n-butylsulphoricinoleate. The dispersion of the coupling component may also advantageously contain protective colloids, for example, methylcellulose or small amounts of inert organic solvents which are sparingly soluble or insoluble in water, for example, aromatic hydrocarbons, which may be halogenated or nitrated, for example, benzene, toluene, xylene, chlorobenzene, dichlorobenzenes or nitrobenzene, as well as aliphatic halogenated hydrocarbons, for example, carbon tetrachloride or trichloroethylene; also suitable are organic solvents miscible with water, for example, acetone, methylethylketone, methanol, ethanol or isopropanol.

Coupling may also be carried out advantageously by continuously combining an acidic solution of the diazonium salt with an alkaline solution of the coupling component in a mixing nozzle, during which coupling takes place instantaneously. The pigment dispersion formed is removed continuously from the mixing nozzle and the pigment is isolated by filtration.

The aryldiazoamino compounds to be used in process (b) of the invention may be obtained by a known method by coupling an aryldiazonium salt with a primary or preferably secondary amine. A very wide variety of amines are suitable for this purpose, for example, aliphatic amines, for example, methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid and β-aminoethylsulphuric acid; alicyclic amines, for example, cyclohexylamine, N-methylcyclohexylamine and dicyclohexylamine; aromatic amines, for example, 4-aminobenzoic acid, sulphanilic acid, 4-sulpho-2-aminobenzoic acid, (4 - sulphophenyl)-guanidine, 4 - N - methylaminobenzoic acid, 4-ethylaminobenzoic acid, 1-aminonaphthalene-4-sulphonic acid and 1-aminonaphthalene-2,4-disulphonic acid; heterocyclic amines, for example, piperidine, morpholine, pyrrolidine, dihydroindole and also sodium cyanamide or dicyanodiamide.

Generally, the diazoamino compounds obtained are sparingly soluble in cold water and, if necessary, may be separated from the reaction medium in a crystalline form after salting out. In many cases, the moist press cake may be used as it is in further reactions. In some cases, it may be advantageous to dehydrate the diazoamino compounds by vacuum drying prior to the reaction.

Coupling of the diazoamino compound with the naphthol is carried out in an organic solvent, for example, chlorobenzene, ortho-dichlorobenzene, nitrobenzene, pyridine, ethylene glycol, ethylene glycol monoethylether or ethylene glycol monomethylether, dimethylformamide, formic acid or acetic acid. When using a solvent which is miscible with water, it is not necessary to use the diazoamino compound in an anhydrous form. For example, the water-moist filter cake may be used.

Coupling is advantageously carried out in an acid medium with the application of heat, preferably at a temperature within the range of from 80 to 180° C., and it generally proceeds quickly and is complete. When a neutral solvent is used it is advantageous to add an acid, for example, hydrochloric acid, sulphuric acid, formic acid or acetic acid. By virtue of their insolubility, the pigments obtained may be isolated from the reaction mixture by filtration. Thus, the after-treatment with an organic solvent, to which pigments that have been obtained by coupling in an aqueous medium have to be subjected, is unnecessary in most cases.

The new products are valuable pigments that may be used for a very wide variety of purposes. For example, they may be used in a state of fine division for the spin-coloration of filament and staple-fibre viscose, cellulose ethers, cellulose esters, polyamides, polyurethanes and polyesters, and also in the production of coloured lacquers and lake-formers, solutions or products made from cellulose acetate, nitrocellulose, natural or synthetic resins, for example, polymerization resins or condensation resins, for example, aminoplasts, alkyd resins and phenoplasts, and also polyolefines, for example, polyethylene, polypropylene, polystyrene, polyvinyl chloride, and polyacrylonitrile, and rubber, casein, silicones and silicone resins. They may also be used advantageously in the manufacture of coloured pencils, cosmetic preparations and laminated sheet material.

The following examples illustrate the invention. Unless otherwise stated, the parts and percentages are by weight.

EXAMPLE 1

47.5 parts of the dyestuff obtained by coupling diazotised 2,4,5-trichloroaniline (diazotized with glacial acetic acid, hydrochloric acid and sodium nitrite) with 2,3-hydroxynaphthoic acid are heated for two hours at 135 to 145° C. while stirring with 650 parts of ortho-dichlorobenzene, 20 parts of thionyl chloride and 2 parts of dimethylformamide; dissolution is complete. After cooling the reaction mixture, the uniformly crystalline monocarboxylic acid chloride of the dyestuff is isolated by filtration and washed successively with 400 parts of benzene and 200 parts of petroleum ether. After drying in vacuo at 50 to 60° C., 39 parts of the dyestuff acid chloride are obtained in the form of a red crystalline powder.

6.05 parts of the acid chloride so obtained are stirred in 100 parts of ortho-dichlorobenzene and the batch is heated to 80 to 85° C. A warm solution of 4.4 parts of 4-amino-4'-chloro-N,N'-dibenzoylhydrazine in 10 parts of dimethylformamide and 550 parts of ortho-dichlorobenzene is added and the batch is heated for 12 hours at 140 to 145° C. The finely crystalline, sparingly soluble pigment is then isolated by filtration while hot, washed with hot ortho-dichlorobenzene until the filtrate runs clear, and it is then washed successively with cold methanol and hot water. After drying in vacuo at 80 to 85° C., 7.9 parts of a soft powder are obtained which is virtually insoluble in the common solvents and which colours polyvinyl chloride film and also lacquers an orange shade which possesses excellent fastness to light, migration and overstripe bleeding.

The pigment corresponds to the formula

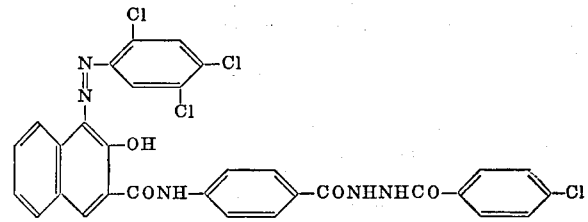

The following table lists components for further monoazo pigments. The pigments may be obtained as described in the first paragraph above, by coupling 1 mol of a diazo compound of an amine listed in column I with 1 mol of 2,3-hydroxynaphthoic acid as listed in column II, the monoazo dyestuff carboxylic acid so obtained is converted into the acid chloride and the latter is condensed with 1 mol of an amine as listed in column III. The shades which the pigments produce in polyvinyl chloride film are indicated in column IV.

| | I | II | III | IV |
|---|---|---|---|---|
| 1 | 2,5-dichloroaniline | 2,3-hydroxynaphthoic acid | 4-amino-3-methyl-N,N'-dibenzoylhydrazine. | Orange. |
| 2 | do | do | 4-amino-3-methyl-2',4'-dichloro-N,N'-dibenzoylhydrazine. | Do. |
| 3 | do | do | 4-amino-2',4'-dichloro-N,N'-dibenzoylhydrazine. | Red. |
| 4 | do | do | 4-amino-4'-chloro-N,N'-dibenzoylhydrazine. | Red. |
| 5 | do | do | 4-amino-3-methyl-4'-chloro-N,N'-dibenzoylhydrazine. | Orange. |
| 6 | do | do | 4-amino-N,N'-dibenzoylhydrazine. | Red. |
| 7 | do | do | 4-amino-2,4'-dichloro-N,N'-dibenzoylhydrazine. | Red. |
| 8 | do | do | N-4-amino-3-methylbenzoyl-N'-acetylhydrazine. | Orange. |
| 9 | do | do | N-4-aminobenzoyl-N'-acetylhydrazine. | Red. |
| 10 | 2-chloro-5-trifluoromethylaniline | do | 4-amino-3-methyl-N,N'-dibenzoylhydrazine. | Orange. |
| 11 | do | do | 4-amino-3-methyl-4'-methoxy-N,N'-dibenzoylhydrazine. | Do. |
| 12 | do | do | 4-amino-3-methyl-2',4'-dichloro-N,N'-dibenzoylhydrazine. | Do. |
| 13 | do | do | 4-amino-2,4'-dichloro-N,N'-benzoylhydrazine. | Do. |
| 14 | do | do | 4-amino-4'-chloro-N,N'-dibenzoylhydrazine. | Red Orange. |
| 15 | do | do | 4-amino-N,N'-dibenzoylhydrazine. | Orange. |
| 16 | do | do | N-4-aminobenzoyl-N'-acetylhydrazine. | Do. |
| 17 | do | do | N-4-amino-3-methylbenzoyl-N'-acetylhydrazine. | Do. |
| 18 | 2-nitro-4-fluoromethylaniline | do | 3-amino-4,4'-dichloro-N,N'-dibenzoylhydrazine. | Do. |
| 19 | Anthranilic acid methylester | do | 4-amino-3-methyl-2'4,'-dichloro-N,N'-dibenzoylhydrazine. | Red. |
| 20 | 2-methyl-5-chloroaniline | do | 4-amino-4'-chloro-N,N'-dibenzoylhydrazine. | Bluish red. |
| 21 | 3-amino-4-chlorobenzoic acid methylester | do | 4-amino-3-methyl-4'-chloro-N,N'-dibenzoylhydrazine. | Orange. |
| 22 | 2,3,5-trichloroaniline | do | 4-amino-2,4'-dichloro-N,N'-dibenzoylhydrazine. | Red. |
| 23 | do | do | 4-amino-3-methyl-4'-chloro-N,N'-dibenzoylhydrazine. | Orange. |
| 24 | 2,4,5-trichloroaniline | do | N-4-aminobenzoyl-N'-acetylhydrazine. | Do. |
| 25 | 2-phenoxy-5-trifluoromethylaniline | do | 4-amino-3-methyl-4'-chloro-N,N'-dibenzoylhydrazine. | Do. |

TABLE—Continued

| I | II | III | IV |
|---|---|---|---|
| 26 | 2-nitro-4-methoxyaniline | do | 4-amino-3-methyl-2',4'-dichloro-N,N'-dibenzoylhydrazine. | Bluish red. |
| 27 | 3-amino-4-methyl benzoic acid phenyl ester | do | 4-amino-2',4'-dichloro-N,N'-dibenzoylhydrazine. | Do. |
| 28 | 3-amino-4-chloro-benzoic acid-2'-chloro-5'-trifluoromethylanilide. | do | 4-amino-3-methyl-4'-chloro-N,N'-dibenzoylhydrazine. | Orange. |
| 29 | do | do | 4-amino-4'-chloro-N,N'-dibenzoylhydrazine. | Red. |
| 30 | do | do | 4-amino-N,N'-dibenzoylhydrazine | Red. |
| 31 | do | do | 4-amino-2',4'-dichloro-N,N'-dibenzoylhydrazine. | Red. |
| 32 | do | do | 4-amino-2,4'-dichloro-N,N'-dibenzoylhydrazine. | Red. |
| 33 | do | do | N-4-aminobenzoyl-N'-acetylhydrazine | Orange. |
| 34 | do | do | N-4-amino-3-methylbenzoyl-N'-acetylhydrazine. | Do. |
| 35 | 3-amino-4-methylbenzoic acid-3'-trifluoromethylanilide. | do | N-4-amino-2-chlorobenzoyl-N'-acetylhydrazine. | Red. |
| 36 | do | do | 4-amino-3-methyl-2',4'-dichloro-N,N'-dibenzoylhydrazine. | Bluish red. |
| 37 | do | do | N-4-amino-3-methylbenzoyl-N'-acetylhydrazine. | Red. |
| 38 | do | do | 4-amino-3-methyl-N,N'-dibenzoylhydrazine. | Red. |
| 39 | 3-amino-4-methylbenzoic acid-2'-chloro-5'-trifluoromethylanilide. | do | 4-amino-N,N'-dibenzoylhydrazine | Red. |
| 40 | 4-methoxy-3-aminobenzoic acid-3'-trifluoromethylanilide. | do | do | Bluish red. |
| 41 | 4-methoxy-3-aminobenzoic acid-2'-chloro-5'-trifluoromethylanilide. | do | do | Do. |
| 42 | 4-methyl-3-aminobenzoic acid-2'-methoxy-5'-chloroanilide. | do | 4-amino-4'-methoxy-N,N'-dibenzoylhydrazine. | Red. |
| 43 | 4-chloro-3-aminobenzoic acid-3'-carbomethoxyanilide. | do | 4-amino-N,N'-dibenzoylhydrazine | Orange. |
| 44 | do | do | 4-amino-3-methyl-2',4'-dichloro-N,N'-dibenzoylhydrazine. | Do. |
| 45 | do | do | N-4-aminobenzoyl-N'-acetylhydrazine | Do. |
| 46 | 4-chloro-3-aminobenzoic acid-2'-methyl-3'-chloroanilide. | do | do | Do. |
| 47 | do | do | 4-amino-2,4'-dichloro-N,N'-dibenzoylhydrazine. | Red. |
| 48 | do | do | 4-amino-2',4'-dichloro-N,N'-dibenzoylhydrazine. | Red. |
| 49 | do | do | N-4-amino-3-methylbenzoyl-N'-acetylhydrazine. | Orange. |
| 50 | 2,5-dichloroaniline | 6-bromo-2-hydroxy-3-naphthoic acid | 4-amino-2',4'-dichloro-N,N'-dibenzoylhydrazine. | Red. |
| 51 | do | do | 4-amino-N,N'-dibenzoylhydrazine | Red. |
| 52 | do | do | 4-amino-4'-chloro-N,N'-dibenzoylhydrazine. | Red. |
| 53 | do | do | N-4-aminobenzoyl-N'-acetylhydrazine | Claret. |
| 54 | do | 6-methoxy-2-hydroxy-3-naphthoic acid | 4-amino-2',4'-dichloro-N,N'-dibenzoylhydrazine. | Do. |
| 55 | do | 2,3-hydroxynaphthoic acid | N-(4-amino-3-methylbenzoyl)-N'-nicotinylhydrazine. | Red. |
| 56 | do | do | N-(4-amino-3-methylbenzoyl)-N'-thienoylhydrazine. | Red. |
| 57 | 3-amino-4-chlorobenzoic acid-2'-chloro-5'-trifluoromethylanilide. | do | N-4-aminobenzoyl-N'-4'-methylbenzenesulphonylhydrazine. | Red. |
| 58 | do | do | N-4-amino-3-methylbenzoyl-N'-4'-methylbenzenesulphonylhydrazine. | Red. |
| 59 | 2,4,5-trichloroaniline | 6-nitro-2-hydroxy-3-naphthoic acid | 4-amino-4'-chloro-N,N'-dibenzoylhydrazine. | Red. |

EXAMPLE 2

7.7 parts of the dyestuff derived from 1 mol of diazotized 3-amino-4-chlorobenzoic acid and 1 mol of 2,5-dimethoxy-4-chloro-1-acetoacetylaminobenzene of the formula

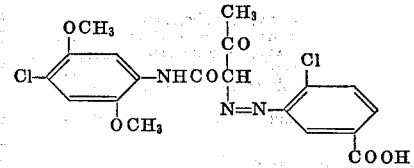

are stirred in 460 parts of ortho-dichlorobenzene and 0.5 part of dimethylformamide and the batch is heated to 75 to 90° C. 2.85 parts of thionyl chloride are added at that temperature within 5 minutes and the batch is stirred for a further two hours at 120 to 130° C. The end of the reaction is indicated by the cessation of hydrochloric acid evolution and when a test sample shows uniform yellow needles under the microscope. The batch is allowed to cool to 30° C., whereupon it is suction-filtered and the filter residue is washed successively with 200 parts of benzene and 150 parts of petroleum ether. After drying at 50 to 60° C. in vacuo, 7.1 parts of the dyestuff acid chloride are obtained in the form of a yellow crystalline powder.

4.8 parts of the acid chloride so obtained are stirred in 100 parts of ortho-dichlorobenzene together with 0.2 part of thionyl chloride and the batch is heated to 80 to 85° C. A warm solution of 2.8 parts of 4-amino-3-methyl-N,N'-dibenzoylhydrazine in 350 parts of ortho-dichlorobenzene is then added and the whole is heated for 12 hours at 140 to 145° C. The pigment that forms is then isolated while hot by suction filtration and washed with hot ortho-dichlorobenzene until the filtrate runs colourless. The dichlorobenzene is removed with cold methanol and the product is given a final thorough wash with hot water. After drying at 60 to 90° C., 6.6 parts of a soft powder are obtained which is virtually insoluble in the common solvents and which produces a bright yellow shade possessing good fastness to migration and light when worked into polyvinyl chloride on a roller mill. The pigment corresponds to the formula

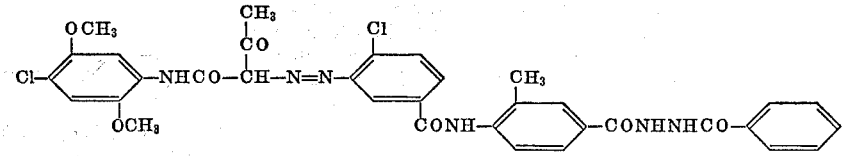

The following table lists components for further monoazo pigments. The pigments may be obtained as described in the first paragraph above by coupling 1 mol of a diazo compound of an aminocarboxylic acid listed in column I with 1 mol of the acetoacetyl compound of an amine listed in column II, the monoazo dyestuff carboxylic acid so obtained is converted into the acid chloride and the latter is condensed with 1 mol of the amine listed in column III. The shades which the pigments produce in polyvinyl chloride film are indicated in column IV.

detectable in the filtrate. After drying at 80 to 90° C. in vacuo, 7.0 parts of the red pigment of the formula

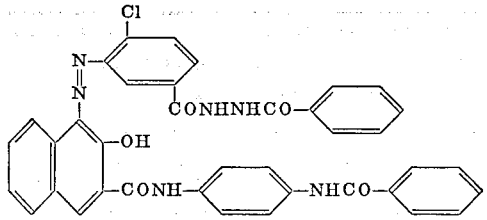

| I | II | III | IV |
|---|---|---|---|
| 60... 3-amino-4-chlorobenzoic acid | 2,5-dimethoxy-4-chloroaniline | 4-amino-2,4'-dichloro-N,N'-dibenzoylhydrazine | Greenish yellow |
| 61......do | do | 4-amino-4'-chloro-N,N'-dibenzoylhydrazine | Reddish yellow. |
| 62......do | do | 4-amino-3-methyl-2',4'-dichloro-N,N'-dibenzoylhydrazine. | Yellow. |
| 63......do | do | 4-amino-3-methyl-N,N'-dibenzoylhydrazine | Do. |
| 64......do | 2-methoxyaniline | do | Do. |
| 65......do | do | 4-amino-2',4'-dichloro-N,N'-dibenzoylhydrazine | Greenish yellow. |
| 66......do | do | 4-amino-N,N'-dibenzoylhydrazine | Do. |
| 67......do | do | N-4-aminobenzoyl-N'-acetylhydrazine | Do. |
| 68......do | 2,5-dimethoxy-4-bromoaniline | 4-amino-2',4'-dichloro-N,N'-dibenzoylhydrazine | Yellow. |
| 69......do | do | 4-amino-3-methyl-N,N'-dibenzoylhydrazine | Do. |
| 70......do | α-naphthylamine | 4-amino-3-methyl-2',4'-dichloro-N,N'-dibenzoylhydrazine. | Do. |
| 71......do | do | 4-amino-N,N'-dibenzoylhydrazine | Do. |
| 72... 3-amino-4,6-dichlorobenzoic acid | 2,5-dimethoxy-4-chloroaniline | 4-amino-2',4'-dichloro-N,N'-dibenzoylhydrazine | Do. |
| 73... 3-amino-4-methylbenzoic acid | do | 4-amino-4'-chloro-N,N'-dibenzoylhydrazine | Do. |

EXAMPLE 3

3.65 parts of 3-amino-4-chloro - N,N' - dibenzoylhydrazine are diazotised in the usual manner with glacial acetic acid, aqueous hydrochloric acid, ice and sodium nitrite.

Separately from this, 4.8 parts of 4-(2'-hydroxy-3'-naphthoylamino) - 1 - benzoylaminobenzene are dissolved cold in a mixture of 150 parts of ethanol, 150 parts of water and 5 parts of 30% sodium hydroxide solution. 1 part of the condensation product derived from 8 mols of ethylene oxide and 1 mol of para-tertiary-octylphenol is added to the solution and then the naphthol is precipitated with 30% acetic acid while stirring well at a pH of 6.0 to 6.5. Coupling is effected by addition of the diazo solution described in the preceding paragraph at a temperature of 20 to 30° C. while maintaining a pH of 6 to 6.5 by addition of a sodium carbonate solution. To complete coupling, stirring is continued for 1 hour at the same temperature. The pigment suspension which forms is rendered acid to Congo paper by the addition of hydrochloric acid, and the pigment is isolated by filtration. It is washed with hot water until chlorine ions are not longer are obtained. It is sparingly soluble to insoluble in the common solvents and colours polyvinyl chloride film and lacquers an orange shade possessing good fastness to migration, over-stripe bleeding and light.

The following table lists components for further monoazo pigments. The pigments may be obtained by coupling 1 mol of a diazo compound (or 2 mols when coupling with bisacetoacetyl compounds) of an amine as listed in column I with 1 mol of a coupling component of a 2,3-hydroxynaphthoic or acetoacetylarylide as listed in column II. The shades which the pigments produce in polyvinyl chloride film are indicated in column III.

| I | II | III |
|---|---|---|
| 74... 3-amino-4-chloro-N,N'-dibenzoylhydrazine | 4-(2'-hydroxy-3'-naphthoylamino)-1-para-chlorobenzoylaminobenzene | Red. |
| 75...... do | 4-(2'-hydroxy-3'-naphthoylamino)-2,5-dimethyl-1-benzoylaminobenzene | Red. |
| 76...... do | 4-(2'-hydroxy-3'-naphthoylamino)-2-methoxy-5-chloro-1-parachlorobenzoylaminobenzene. | Red. |
| 77...... do | 2-hydroxy-3-naphthoic acid-2',4'-dimethoxy-5'-chloroanilide | Red. |
| 78...... do | 2-hydroxy-3-naphthoic acid-2'-methoxyanilide | Red. |
| 79...... do | 2-hydroxy-3-naphthoic acid anilide | Red. |
| 80... 3-amino-4-methyl-N,N'-dibenzoylhydrazine | 4-(2'-hydroxy-3'-naphthoylamino)-2,5-dimethyl-1-benzoylaminobenzene. | Bluish red. |
| 81...... do | 4-(2'-hydroxy-3'-naphthoylamino)-1-benzoylaminobenzene | Do. |
| 82...... do | 2-hydroxy-3-naphthoic acid-2',4'-dimethoxy-5'-chloroanilide | Do. |
| 83... N-(3-amino-4-methylbenzoyl)-N'-acetylhydrazine | 4-(2'-hydroxy-3'-naphthoylamino)-1-benzoylaminobenzene | Do. |
| 84...... do | 5-(2'-hydroxy-3'-naphthoylamino)-benzimidazolone | Do. |
| 85... 3-amino-4-methoxy-N,N'-dibenzoylhydrazine | 4-(2'-hydroxy-3'-naphthoylamino)-2-methoxy-5-chloro-1-benzoylaminobenzene. | Do. |
| 86...... do | 4-(2'-hydroxy-3'-naphthoylamino)-2,5-dimethyl-1-benzoylaminobenzene. | Do. |
| 87... N-(3-amino-4-methoxybenzoyl)-N'-acetylhydrazine | do | Do. |
| 88...... do | 2-hydroxy-3-naphthoic acid-1-naphthylamide | Do. |
| 89...... do | 4-(2'-hydroxy-3'-naphthoylamino)-2-methoxy-5-chlorodiphenylurea | Do. |
| 90... 4-amino-3-methyl-2',4'-dichloro-N,N'-dibenzoylhydrazine. | 2,5-dimethoxy-4-chloro-1-acetoacetylaniline | Yellow. |
| 91... N-(4-amino-3-methoxybenzoyl)-N'-formylhydrazine | 4-(2'-hydroxy-3'-naphthoylamino)-1-benzoylaminobenzene | Bluish red. |

EXAMPLE 4

3.6 parts of the diazoamino compound of the formula

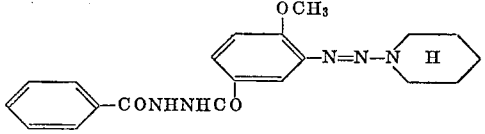

prepared by coupling diazotized 3-amino-4-methoxy-N,N'-dibenzoylhydrazine with piperidine in an alkaline medium, and 3.6 parts of 4-(2'-hydroxy-3'-naphthoylamino)-5-chloro-2-methoxy-1-benzoylaminobenzene are suspended in 250 parts of ortho-dichlorobenzene, the batch is heated to 70 to 75° C. and then 20 parts of glacial acetic acid are added. The batch is stirred for 2 hours at 120 to 130° C., during which cleavage of the diazoamino compound and coupling to form the pigment are completed. The red pigment is isolated by filtration while hot and washed successively with hot ortho-dichlorobenzene, cold methanol and hot water. After drying in vacuo at 80° C., a bluish red monoazo pigment of the formula

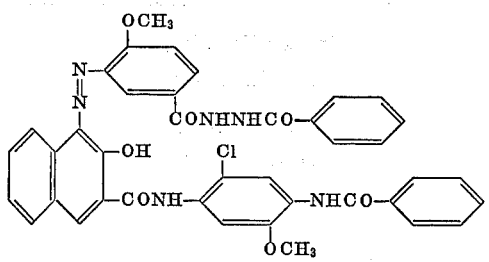

is obtained in a good yield. It is sparingly soluble to insoluble in the common solvents and colours polyvinyl chloride a red shade fast to light, overstripe bleeding and migration.

EXAMPLE 5

A mixture is prepared from 65 parts of stabilized polyvinyl chloride, 35 parts of dioctyl phthalate and 0.2 part of the pigment obtained in the manner described in Example 1 and then worked to and fro for 7 minutes on a two-roller mill at 140° C. A pure orange film possessing very good fastness to light and migration is obtained.

I claim:

1. A monoazo pigment selected from the compound of the formulae

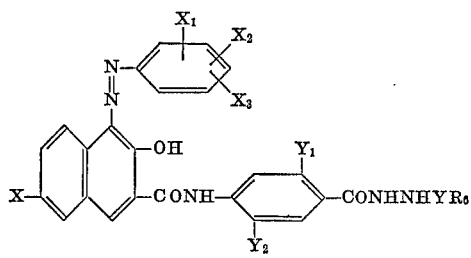

and

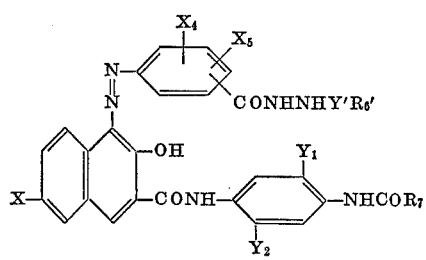

in which X represents hydrogen, bromine, nitro or lower alkoxy, Y represents —CO— or —SO$_2$—, Y' represents —CO— and $X_1$ and $X_2$ each represents hydrogen, chlorine, lower alkyl, lower alkoxy, phenoxy, chlorophenoxy, nitro, lower carbalkoxy, carbophenoxy, or trifluoromethyl, $X_3$ represents hydrogen, chlorine or a group of the formula —CONHR$_5$ in which R$_5$ represents hydrogen, lower alkyl, phenyl or phenyl substituted by chlorine, lower alkyl, trifluoromethyl, lower alkoxy, or lower carbalkoxy, $Y_1$ and $Y_2$ each represents hydrogen, chlorine or lower alkyl and where Y is —CO—, R$_6$ is lower alkyl, phenyl, chlorophenyl, carbomethoxyphenyl, dichlorophenyl, or lower alkoxyphenyl, and where Y is —SO$_2$—, R$_6$ is phenyl or methylphenyl and R'$_6$ is phenyl, chlorophenyl, dichlorophenyl or lower alkyl; $X_4$ represents chlorine, lower alkyl, lower alkoxy, $X_5$ represents hydrogen or chlorine, and R$_7$ represents hydrogen, phenyl, anilino, or chlorophenyl.

2. A monoazo pigment as claimed in claim 1 of the formula

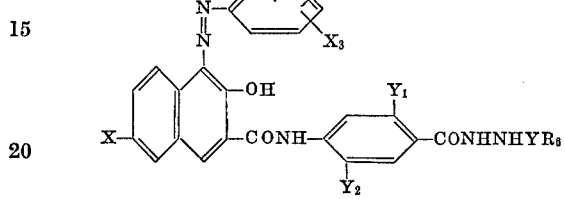

in which X represent a hydrogen, bromine, nitro or lower alkoxy, Y represents —CO— or —SO$_2$—, $X_1$ and $X_2$ each represents hydrogen, chlorine, lower alkyl, lower alkoxy, phenoxy, chlorophenoxy, nitro, lower carbalkoxy, carbophenoxy, or trifluoromethyl, $X_3$ represents hydrogen, chlorine or a group of the formula —CONHR$_5$ in which R$_5$ represents hydrogen, lower alkyl, phenyl or phenyl substituted by chlorine, lower alkyl, trifluoromethyl, lower alkoxy, or lower carbalkoxy, $Y_1$ and $Y_2$ each represents hydrogen, chlorine or lower alkyl and where Y is —CO—, R$_6$ is lower alkyl, phenyl, chlorophenyl, carbomethoxyphenyl, dichlorophenyl, or lower alkoxyphenyl, and where Y is —SO$_2$—, R$_6$ is phenyl or methylphenyl.

3. A monoazo pigment of the formula

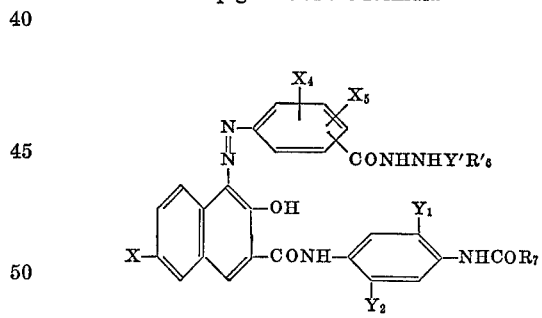

in which X, Y', $Y_1$, $Y_2$ and R'$_6$ have the meanings given in claim 9, $X_4$ represents chlorine, lower alkyl, lower alkoxy, $X_5$ represents hydrogen or chlorine, and R$_7$ represents hydrogen, phenyl, anilino or chlorophenyl.

4. A monoazo pigment as claimed in claim 2 selected from the group consisting of the formula

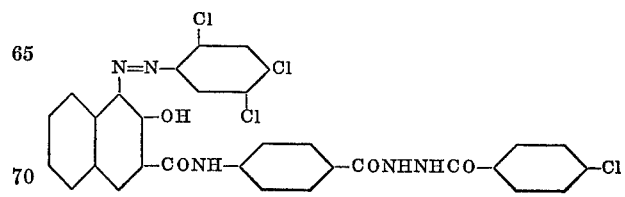

5. A monoazo pigment as claimed in claim 2 selected from the group consisting of the formula

6. A monoazo pigment as claimed in claim 2 selected from the group consisting of the formula
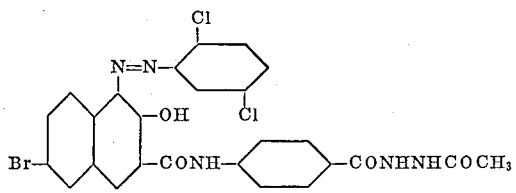
7. A monoazo pigment as claimed in claim 3 selected from the group consisting of the formula
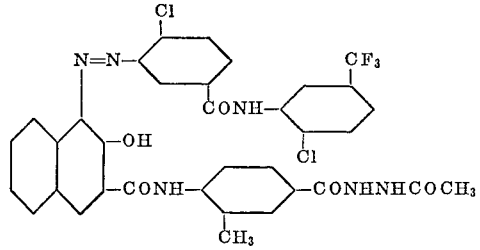
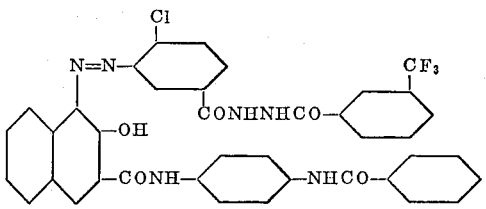
References Cited
UNITED STATES PATENTS
3,329,671  7/1967  Ronco _____ 260—204
HENRY R. JILES, Primary Examiner
C. F. WARREN, Assistant Examiner
U.S. Cl. X.R.
260—152, 156, 165, 193, 204, 551 R

CASE 6329/E

PO-1050
(5/69)

UNITED STATES PATENT OFFICE
CERTIFICATE OF CORRECTION

Patent No. 3,652,533     Dated     March 28, 1972

Inventor(s) ARMAND ROUECHE

It is certified that error appears in the above-identified patent and that said Letters Patent are hereby corrected as shown below:

Column 14, claim 3, line 2 after the structural formula, delete "claim 9" and insert --- claim 1 ---.

Column 16, claim 7, lines 1-10, amend the top, right-hand side of the structural formula to read:

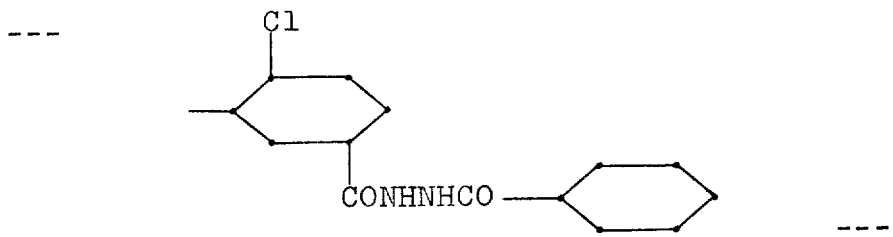

Signed and sealed this 23rd day of January 1973.

(SEAL)
Attest:

EDWARD M. FLETCHER, JR.
Attesting Officer

ROBERT GOTTSCHALK
Commissioner of Patents jac